(12) United States Patent
Toyoshima

(10) Patent No.: US 8,594,729 B2
(45) Date of Patent: Nov. 26, 2013

(54) WIRELESS MODEM MODULE SERVER SYSTEM

(71) Applicants: Sony Corporation, Tokyo (JP); Sony Electronics Inc., Park Ridge, NJ (US)

(72) Inventor: Akihiko Toyoshima, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 13/713,663

(22) Filed: Dec. 13, 2012

(65) Prior Publication Data

US 2013/0100317 A1    Apr. 25, 2013

Related U.S. Application Data

(63) Continuation of application No. 09/974,724, filed on Oct. 9, 2011, now Pat. No. 8,369,892.

(60) Provisional application No. 60/240,011, filed on Oct. 13, 2000.

(51) Int. Cl.
  *H04N 5/232*    (2006.01)

(52) U.S. Cl.
  USPC ........................................ 455/557; 348/231.2

(58) Field of Classification Search
  USPC ................. 455/556.1, 556.2, 557; 348/231.2, 348/231.3, 231.99, 207.1, 232
  See application file for complete search history.

(56) References Cited

U.S. PATENT DOCUMENTS 6,694,430 B1 * 2/2004 Zegelin et al. ................ 713/160
6,728,531 B1 * 4/2004 Lee et al. ..................... 455/419

* cited by examiner

*Primary Examiner* — Sam Bhattacharya
(74) *Attorney, Agent, or Firm* — John L. Rogitz

(57) ABSTRACT

An apparatus and method for managing data for a wireless device, which includes a first memory for storing received data of a wireless device, a second memory for storing a network operational file, the operational file consisting of instructions for selecting a destination using a wireless module of the wireless device, and instruction steps for operating the network operational file for sending the received data using the wireless module to the selected destination.

10 Claims, 6 Drawing Sheets

FIG.3 Data Flow on Receiving

FIG.4 Data Flow on Transmitting

FIG.5 Remote File management

WIRELESS MODEM MODULE SERVER SYSTEM

CROSS REFERENCE TO RELATED DOCUMENTS

This application incorporates herein by reference U.S. patent application Ser. No. 09/972,761, of Akihiko Toyoshima, for SYSTEM AND METHOD FOR ACTIVATION OF A WIRELESS MODULE, filed Oct. 5, 2001; U.S. patent application Ser. No. 09/976,455, of Akihiko Toyoshima, for HOME NETWORK USING WIRELESS MODULE, filed Oct. 11, 2001 U.S. patent application Ser. No. 09/972,760, of Akihiko Toyoshima, for MULTIPLE WIRELESS FORMAT PHONE SYSTEM AND METHOD, filed Oct. 5, 2001; U.S. patent application Ser. No. 09/972,183, of Akihiko Toyoshima, for WIRELESS MODULE SECURITY SYSTEM AND METHOD, filed Oct. 5, 2001, U.S. patent application Ser. No. 09/977,080, of Akihiko Toyoshima, for A DEFAULT PORTAL SITE ACCESS WITH WIRELESS MODULE, filed Oct. 12, 2001; and U.S. patent application Ser. No. 09/972,781, of Akihiko Toyoshima, for SYSTEM, METHOD AND APPARATUS FOR EMBEDDED FIRMWARE CODE UPDATE, filed Oct. 5, 2001; and U.S. patent application Ser. No. 09/928,582, of Baranowski, et al.; for WIRELESS MODULE, filed Aug. 13, 2001; and Provisional Patent Application Ser. No. 60/240,001; of Juan, et al, for PORTABLE WIRELESS MODEM, filed Oct. 13, 2000, the benefit whose priority date is hereby claimed.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates to a removable wireless modem module and data storage. More particularly, this invention relates to a host data storage, wireless transmission module, and the efficient memory allocation scheme for transferring data between the wireless memory module to the host data storage.

BACKGROUND OF THE INVENTION

Data at a remote wireless device, such as a digital camera, mobile telephone, PDA, or the like may be transferred to and utilized on a home computer and to be incorporated into e-mail documents, e-mails, and sent to the World Wide Web. Generally, data is copied to the personal computer or transmitted via e-mail using an on-line internet service provider via a modem from the user's personal computer. These methods take time and involve multi-step procedures. It would be desirable to immediately share pictures or data acquired by a remote wireless device with friends or relatives.

Moreover, it is desirable to transmit data from a location without personal computer access, to free up storage at the mobile device, in essence, a more efficient memory allocation system, whereby requiring less interchanging of memory module, as the memory storage device and utilizing a wide variety of connection means to on-line services, such as America On Line, internet service provider's, and other services. Since each of these services requires an account name, password, etc., and local telephone connections, therefore, such a system as described, would require automatic modifications to include all of these required settings.

SUMMARY OF THE INVENTION

Currently, it is an object of the present invention to provide an electronic mobile wireless device for collecting data at a remote location and transferring the data to a storage at a host location.

As shown in FIG. 1 of the related art, a remote device 25 of a mobile host 10 includes a wireless module 20, a memory module 15 and may also include a memory module such as a Sony Memory Stick, when the Memory Stick is full, another memory stick will be interchanged therein. The data at the remote device will be transmitted to the base station 40 and further transmitted to a storage server 60 thorough the internet via a router device 50.

Such storage facilities 70 located at the storage server may include, for example, Sony's Image Station, or America On-Line's "Get Pictures", and Yahoo Pictures, etc. In an alternate manner the Memory Stick with the data will be decoupled from a remote device and coupled to the computer (not shown) with a memory stick slot and internet connectivity.

The present invention is directed to a system and method that provides a way of directly storing at least a portion of collected data to an external host memory system.

The wireless modem device provides a conveniently mobile device which receives data and transfers that data in real time to a separate storage service at a remote location.

Hence, the present invention fulfills a need for mobile devices of acting as a buffer memory device that periodically transfers data to an external storage memory, which can easily be accessed by a plurality of host processes for processing the collected data.

Further, since the external storage memory already exists for use by other device functions, utilizing the unused space of the external device memory increases overall hardware efficiency.

In one embodiment, the present invention is directed to a system for managing data generated by mobile source or sources and includes a host system with a storage unit, wherein the host unit and storage unit is coupled by a wireless modem so as to operate periodically to receive data from one or more mobile devices, transfer the data at a predetermined point determined by a threshold (i.e., storage capacity, etc.), and empty the redundant data in the mobile unit when a transfer of data is completed.

In another embodiment, the present invention is directed to a method for managing data in a mobile device, including receiving data from one or more sources to a host device, and storing that data in a memory stick like device within the host device, transferring the data from the memory stick device to a location upon reaching a predetermined condition, and then repeating the process. Further, if the data which is addressed at the mobile device, and the integrated available memory is sufficient or near capacity, the data can be transferred immediately to server device where such data can be easily retrieved.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to a preferred embodiment(s), it will be understood that various changes and modifications may be made without departing from the spirit and scope of this invention. It is intended that the appended claims be interpreted to cover the embodiments described herein and all equivalents thereto.

Figure 1:
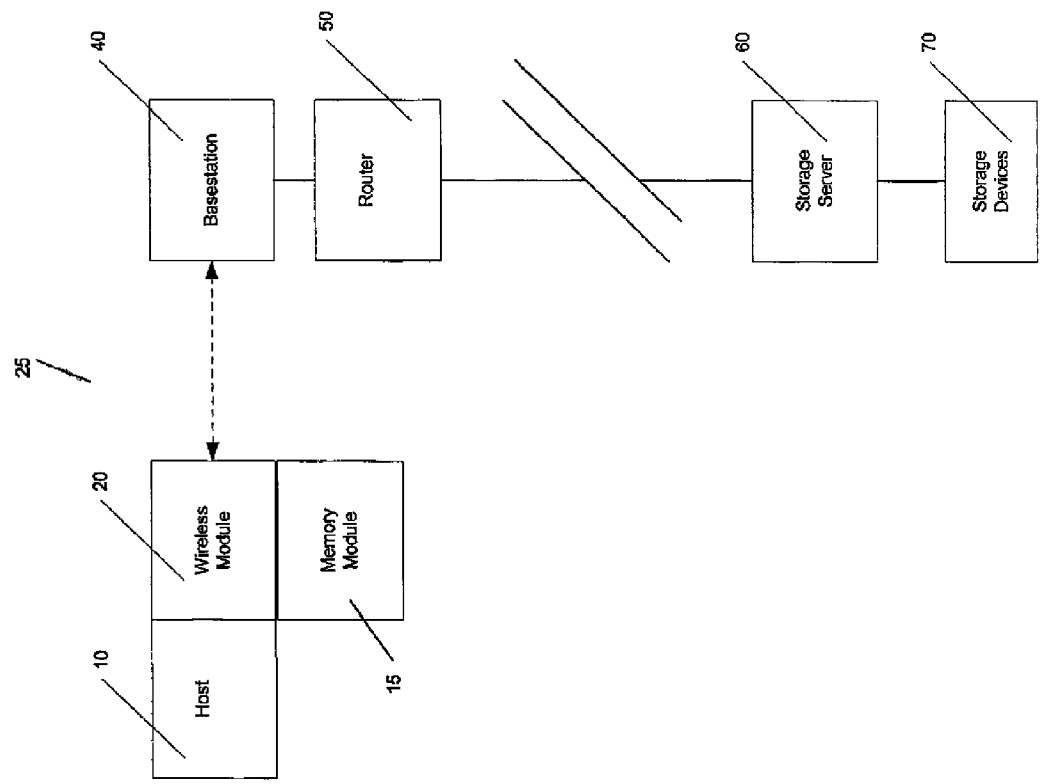
FIG. 1 shows a block diagram illustrating an overview of a related device.
Figure 2:
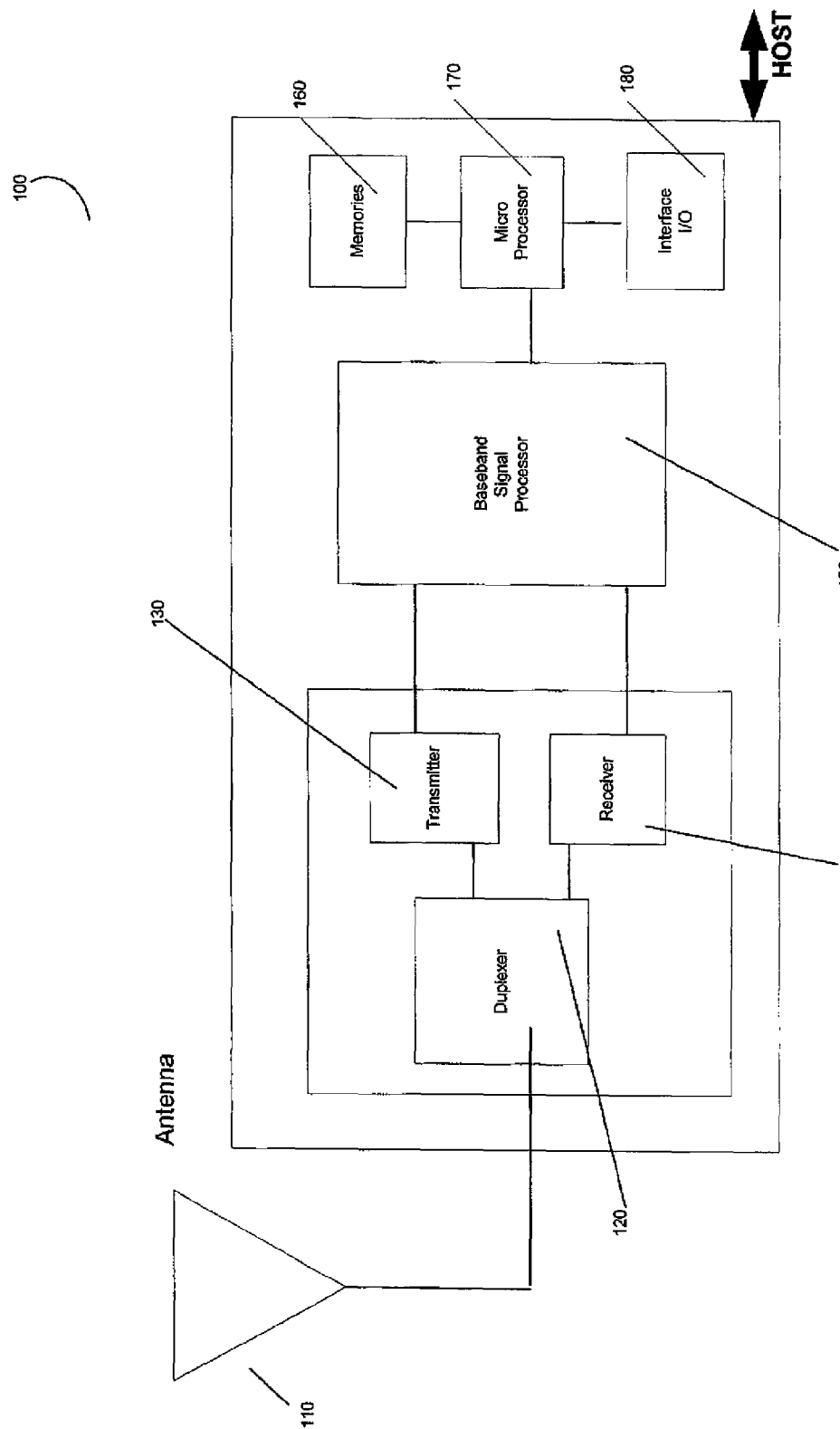
FIG. 2 shows a block diagram of the wireless module.

Turning to FIG. 2, a system block diagram of the wireless module is shown. The wireless module 100 includes an antenna 110 connected to a transceiver circuit. The transceiver circuit 115 is made up of a duplexer 120, a transmitter 130, and a receiver 140 connected therein. The transmitter 120 and receiver 140 of the transceiver circuit are connected to a baseband signal processor circuit 150. The baseband signal processor circuit 150 is connected to a microprocessor 170, which are in turn connected to memories (160) and to an interface input/output (I/O) 180. A host or peripheral unit/device is also used to connect to the wireless module 100 via interface I/O (180).

In a receive mode operation, wireless module 100 receives signals containing data packets via antenna 110 and forwards the received signals and data packets to the duplexer 120, through receiver 140, and to the baseband signal processor circuit 150. The data packets are then forwarded to microprocessor 170 and through interface I/O to the host. For example, the host device may be a PC, laptop, PDA, wireless telephone, or any other type of device or unit which receives the data packets/received signals.

In a transmit mode operation, the wireless module 100 receives data from memory and the wireless module 100 then transmits data packets utilizing at least one wireless format, including, but not limited to, CDMA one, CDMA 2000 (1x/3x, 1xEv DO, W-CDMA, GSM, GPRS, (dedicated short-range communications, or D.S.R.C) and the like.

The baseband signal processor 150 also includes a modulation/demodulation (hereinafter "modulation") unit (not shown) connected to a data transfer unit. The modulation unit converts the received signals to a baseband signal and supplies the demodulated baseband signal to the data transfer unit where data packets can be extracted, e.g., an audio signal, a video signal, and control signals, from the received signals. The data transfer unit also sends the extracted data packets to microprocessor 170. When the host transmits signals containing data packets, the modulation unit converts the data packets into transmission signals which are sent to data transfer unit and to the transmitter or receiver.

The baseband signal processor 150 includes an optional data packetize/depacketize unit (not shown) for packetizing/depacketizing transmission signals and received signals prior to sending transmission signals and received signals to transceiver circuit and microprocessor 170.

The baseband signal processor 150 also includes an error correction unit (not shown) for correcting data error prior to communication data to transceiver circuit and microprocessor 170.

Figure 3:
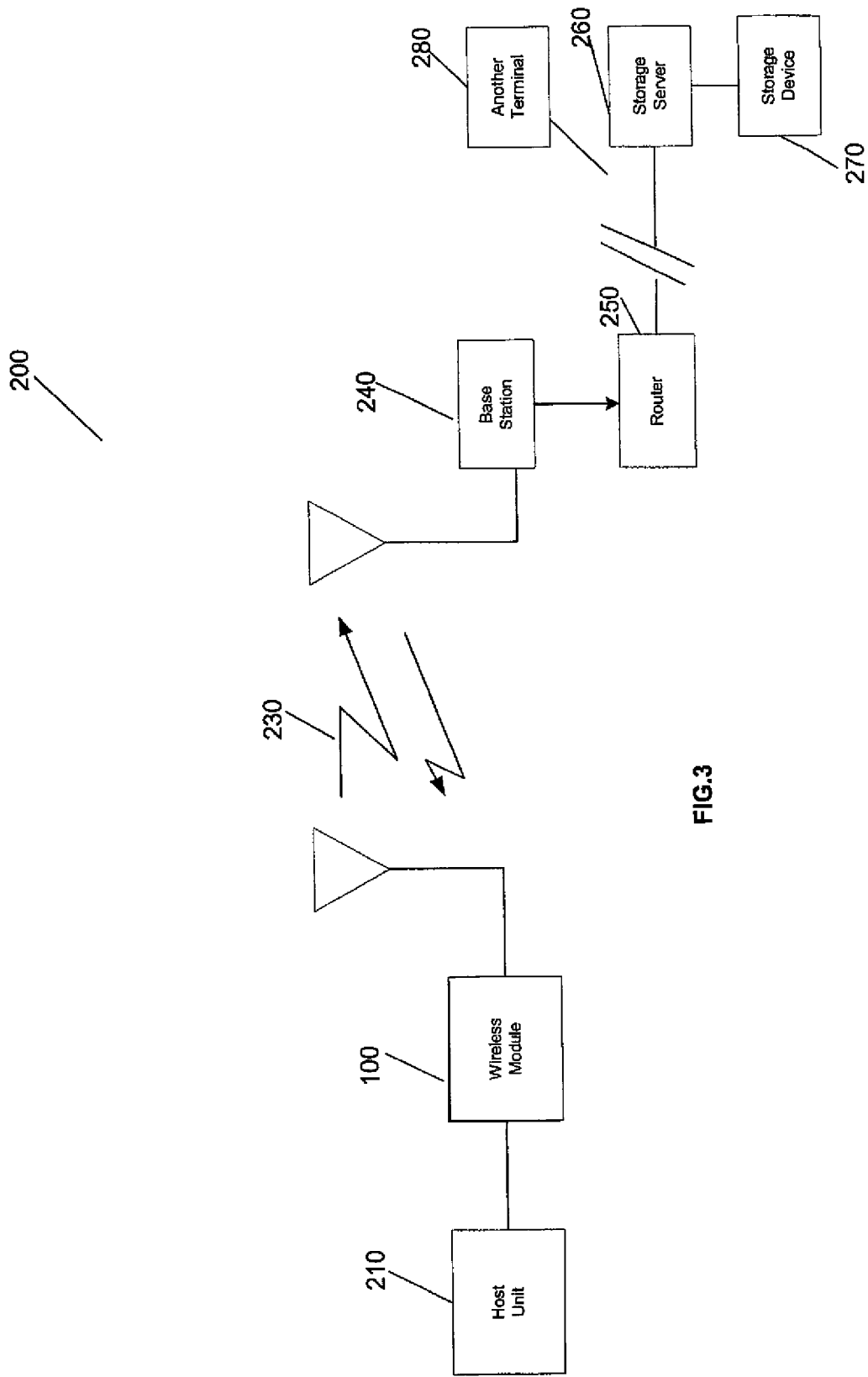
FIG. 3 shows a block diagram overview of an illustrated embodiment of a system according to the present invention.

Turning now to FIG. 3, a system block diagram of the present invention is shown and includes a host base station 240, router 250, terminal 280, storage server 260 and storage device 270. The wireless module 100, is coupled to a mobile host unit 210, which has a wireless communications interface 230 to the host bast station 240.

A microprocessor (not shown) controls the mobile device 210, which is coupled to the communications wireless modem 100. The microprocessor controls the operation of the wireless device 100 and the interchanges of data through the communication coupling 230, which directs the operation of the host base station 240.

When the mobile device 210 is purchased, it is provided with a software application, located on a disk for example, providing the host base station 240 software that enables the user to provide the specified internet service provider, network addresses, families, friends, associates, related accounts, such as billing information. The user can also select the storage server 260, or the storage device 270, depending on the kind of mobile device being used.

Alternate the application software may be downloaded, via a wireless coupling or a memory card reader, to a removable memory module, which can be coupled to the mobile device, or can simply be received by the mobile device through a wireless coupling or a USB connection or the like.

Further, the data can be downloaded to the mobile device 210 via the host base station 240 and written to the mobile device's internal memory or their removable memory card in the internal device.

The wireless module of the mobile device can disconnect the mobile device from the host base station, so a user can operate the mobile device. For example, if the mobile device is a camera, the user can take numerous pictures, which are either stored in the internal memory of the memory card of the camera, or in both of the camera memory and the wireless module memory. After taking pictures, the user would review the pictures, i.e., scroll through the images, and select the desired pictures that are to be sent for printing, e-mailing or making into an album, and compose the order using a set of options. Selections can be made by utilizing a series of command options that would be included or activated by a keypad interface on the mobile device. This user file will then be stored in the internal memory mobile device or the wireless detachable memory module.

When the digital camera, for instance, does not have enough memory space, the host would transfer the data to the storage server, so the digital camera's memory is increased. Also, a threshold indicator could indicate that a transfer operation is taking place. Upon this transfer operation, the memory in the digital camera would become available, and the data now stored in the storage device at a remote location.

For printing digital photographs, the user would select quantity, print size and quantity level of the images to be printed. For example, a user might choose standard images or enlarged images. The print order is specified in a utilization file that identifies the order, which includes pointers to the image files that store the required print order. The host base station 240 would download the image data to a storage server 260 and the data would be stored in a storage device 270, and then be applied to a web-based application such as the Sony Image Station, Yahoo Pictures, AOL Get Pictures, etc. Therein the user could further redefine the kind of print operations. This would include determining the quantity, quality and which images are to be printed. The user would then be able to continue taking more photographs using the mobile device.

Further, the mobile device may include a send command (real-time command), which would enable the user to transmit the images to specific e-mail (via the server) addresses using appropriate communications protocol, in essence, email to, etc. This would enable friends and relatives to receive e-mail photographs in real-time or close to real-time transmission.

Figure 4:
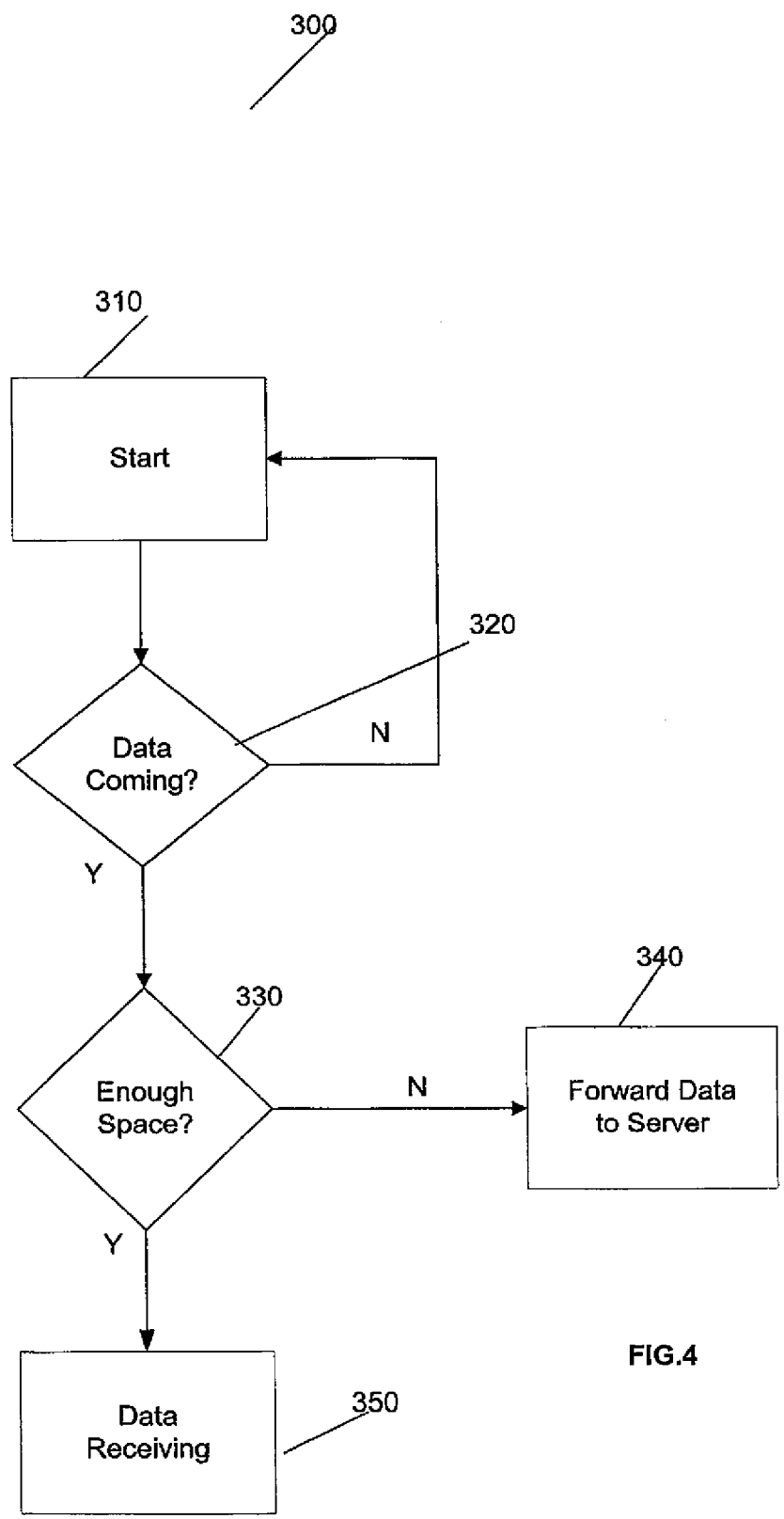
FIG. 4 shows a block diagram overview of a system according to the present invention, which includes a data collection function.

FIG. 4 describes a memory allocation scheme in which the present invention can be implemented. Additionally, data is received at 320 and at step 330 the memory device size is assessed. It should be understood that the size of the memory device will vary, depending on the number of storage bytes available. Presently, it can store either a 32 k bytes, 64 k bytes, 128 k bytes, or 256 k bytes, but of course this can be increased.

Upon achieving a predetermined level based on the memory size and the particular static mode, data forwarding signals are sent to the host server, and at step 340, the data is transmitted from the mobile device through an interface to the host server. Alternatively, at step 350, data receivable at the mobile device can be sent by the base station.

In another mode of operation, the status of the mobile device is first determined, and when it is available, the forward data server is actuated and the data is transferred to the external memory storage.

The mobile host is notified that data is to be received. It will check if the received data has been received fully. If it is acceptable, the mobile host will receive the data to the memory device inside the mobile host unit or attach memory device. However, if it cannot receive such memory due to memory space or other reasons, the mobile host will request that the data be forwarded to a storage server. More importantly, depending on how the data is transferred, the base station will receive the data once and then be transferred to the server.

Figure 5:
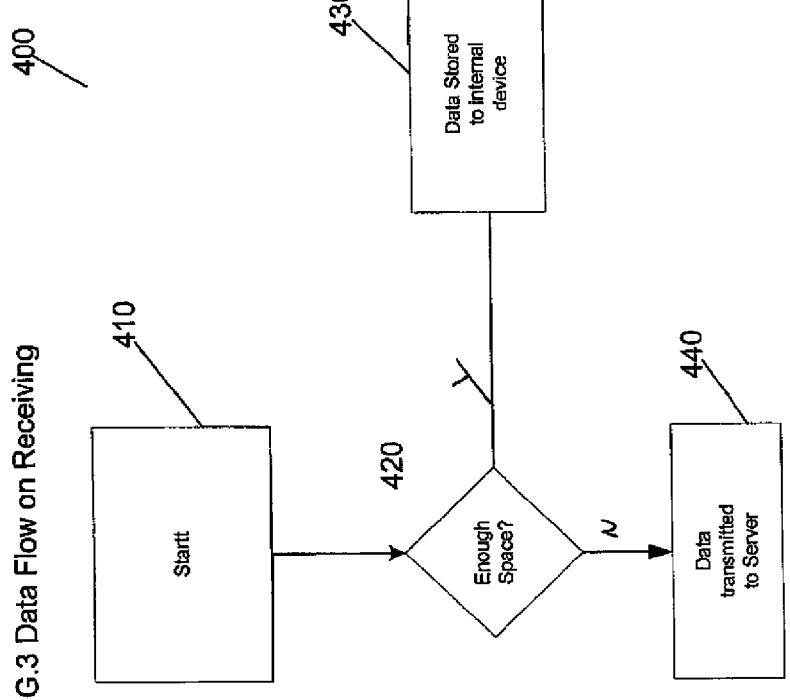
FIG. 5 shows a block diagram overview of a system according to the present invention, which includes the threshold space determination functionality according to the present invention.

FIG. 5 shows data flow diagram on transmitting, and ascertaining therein, if there is enough data space within the mobile module. In this particular case, the mobile host device has a program which checks the amount of space allocated. Depending on the threshold settings at step 420, a decision can be made whether to store data internally 430, or alternatively, transmit data to a server 440.

Figure 6:
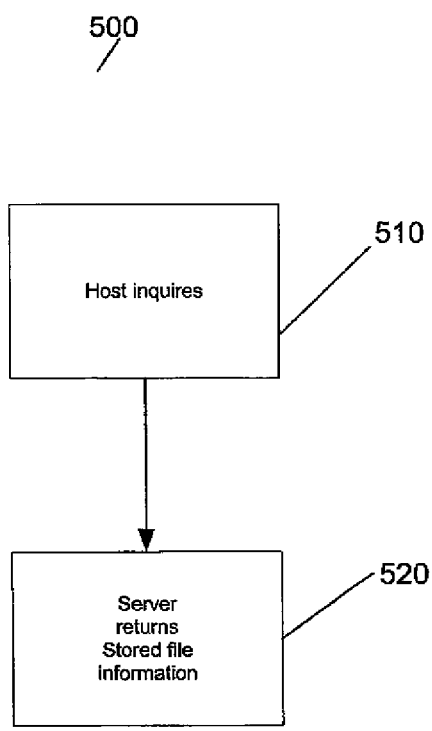
FIG. 6 shows a block diagram overview of a system according to the present invention, which includes a data flow of transmitting data.

FIG. 6 determines host inquiries 510 from the host base station. The server returns stored files in step 520. Accordingly, this is simply a way of responding to base station host updates.

Thus it is apparent that in accordance with the present invention, an apparatus that fully satisfies the objective, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A device, comprising:
   a digital camera module;
   a wireless transceiver removably coupled to the device; and
   a memory for storing digital photographs from the digital camera module, wherein data is sent using the wireless transceiver to a secondary device and/or location via a network, and the device includes an indication of some aspect of a transfer operation.

2. The device of claim 1, wherein the memory is a first memory and the device includes a second memory located on the wireless transceiver.

3. The device of claim 1, comprising a processor executing a network operational file configured for the device and a selected destination.

4. The device of claim 1, wherein the wireless transceiver is caused to send data on the memory responsive to a determination that an amount of data on the memory exceeds a predetermined threshold.

5. The device of claim 4, wherein the wireless transceiver is caused to send data on the memory in real time to a selected destination.

6. The device of claim 1, wherein a host communicatively coupled to the device can send data via the wireless transceiver to the device.

7. The device of claim 6, wherein the host can send data in real time via the wireless transceiver to the wireless device.

8. The device of claim 1, wherein the device being is a digital camera, PDA, laptop, MP3 player, or a wireless flash memory device.

9. The device of claim 1, wherein the device is connectable to an ISDN, Cellular or DSP network.

10. The device of claim 1, wherein the wireless transceiver integrated into the device.

* * * * *